May 10, 1949.　　　　F. ALBRECHT　　　　2,469,707
METHOD AND APPARATUS FOR FLASH WELDING
Filed June 24, 1947

*INVENTOR.*
FRITZ ALBRECHT
BY
*Donald W. Farrington*

Patented May 10, 1949

2,469,707

UNITED STATES PATENT OFFICE 2,469,707

METHOD AND APPARATUS FOR FLASH WELDING

Fritz Albrecht, Baltimore, Md., assignor to The Glenn L. Martin Company, Middle River, Md., a corporation of Maryland Application June 24, 1947, Serial No. 756,739

12 Claims. (Cl. 219—4)

1

My invention relates to a flash welding arc "anti-quenching" device and more particularly to a system capable of maintaining uniform welding current at the electrodes of a welding machine during the flash period and an improved method of electric flash welding.

In electric flash welding, it is a recognized fact that the lowest possible flashing voltage will produce the best metallurgical and mechanical joint. However, a low flash voltage predisposes the weld arc to become quenched during the flashing period. The effect of the quenching of the arc is to cause the metal being welded to become relatively cool and "freeze" so that as the weld areas are upset the molecules of the metal do not properly coalesce, producing a defective weld joint. The lack of coalescence of the metal may, or may not, result in a visible defect, and although the mechanical strength of the joint is greatly impaired, its condition is not always readily apparent. Numerous attempts have been made to solve the problem of maintaining the arc against "freezing" such as by temporarily reducing or reversing platen feed or by manually increasing the welding voltage. Although these attempts of solution have proved partially successful, in most instances they are too slow or unpredictable to satisfy the demand for more efficient, high-speed, economical flash welding. Another problem solved by this invention is that of cutting off the welding current from highly sensitive material being welded that would otherwise be injured by an excessive flow of current due to "shorting" of the arc gap.

The present invention comprises an electrical current control adapted for connection across the electrodes of an electrical welding circuit capable of detecting a drop in the welding voltage indicative of a tendency to cause quenching of an arc established between the said electrodes and to either supply sufficient additional electrical current to boost and reestablish the arc or disconnect the welding current and a method of flash welding wherein the arc current of an arc welding system is controlled sufficiently and in time to avoid "quenching" of an established arc and re-establish a quenched arc or cut off the welding current before the work is damaged.

It is among the objects of this invention to provide a device for controlling the arc between the electrodes of a flash welding machine to overcome the tendency of the arc to "quench" due to a decrease in voltage and to re-establish such an arc during the welding cycle.

Another object is to provide an auxiliary con-

2 trol for a conventional arc welding machine capable of "triggering" additional current capacity into operation to boost or re-establish the welding arc on development of an undesired drop in the voltage across the electrodes.

Still another object is to provide a control circuit suitable for use with an alternating current system to effect trigger operation of circuit controls within a predetermined time limit on a predetermined drop in voltage therein to either increase or cut-off the welding current.

Another object is to provide an efficient method of increasing the current between the electrodes of an arc welding machine responsive to a predetermined drop in voltage at said electrodes within a fraction of a second during the welding cycle.

Other objects of this invention will become apparent from the following description when taken in conjunction with the drawing in which like numerals refer to like parts in different views in the drawing.

Figure 1:
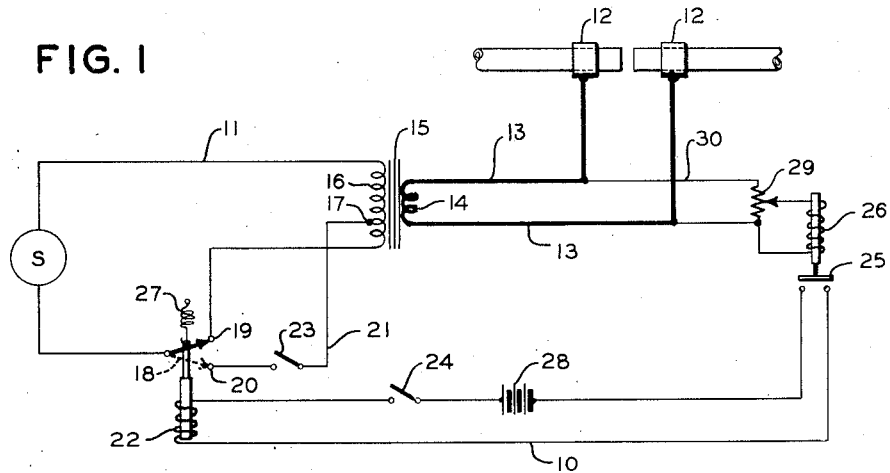
Figure 1 is a schematic diagram of an electrical welding circuit embodying the principles of the present invention.

Referring in detail to the drawing, Figure 1 illustrates the principle of operation of this invention wherein a trigger circuit is arranged for operation in conjunction with a conventional flash welding circuit comprised of a current supply S and primary circuit 11 connected to a transformer 15 having a secondary winding 14 in series with welding leads 13 connected to a pair of movable electrodes 12 operative to hold a pair of tubes as work pieces for flash welding together. It is well recognized in the art that in order to form a proper flash weld joint between work pieces, that they must be heated to the proper welding temperature and maintained thereat until brought together under pressure. In heating the pieces as illustrated in Figure 1, an electrical arc is established therebetween with current flowing from the source S through the primary winding 16 of the transformer 15. Energization of the primary winding 16 induces current in the secondary winding 14 which is conveyed to the welding electrodes 12 by heavy conductors 13. The windings and conductors are designed to provide a welding current of sufficient capacity and voltage to properly heat the tubes provided the arc established therebetween can be maintained for a sufficient period of time required to bring the weld areas to the proper temperature for welding.

The primary winding 16 of transformer 15 is provided with an intermediate tap 17 arranged to reduce the impedance of the transformer as compared with its normal operating impedance, and thereby provide means of temporarily increasing the current output. Shifting of the supply current connections between the primary taps of the transformer winding 16 to partial winding energization to so temporarily increase the power output of the transformer, is accomplished by movement of a shift switch 18 from contact 19 to a second contact 20 of by-pass circuit 21. This shift from one primary tap to the other is effected by actuation of a solenoid 22 against the urge of spring 27 on energization of the trigger circuit 10 in response to a drop of voltage across the welding leads 13. A manually operated cut-off switch 23 is placed in the by-pass circuit 21 and normally placed in closed position so as to provide for energization of winding 16 on operation of the trigger circuit. However, in those instances where it is considered desirable to completely de-energize the welding transformer on operation of the trigger circuit, it is placed in open position. Such complete de-energization has proved highly desirable in the welding of articles composed of aluminum, aluminum alloy, magnesium alloy, and certain thin gauge materials that are susceptible to injury by over-heating if the welding current is allowed to continue to flow across a "frozen" arc gap. When welding materials having these characteristics I have also found that much better work can be produced with the circuit arranged to completely cut off the welding current at the exact moment of upset manifested by a drop in voltage across the welding leads sufficient to operate my trigger circuit.

The trigger circuit 10 is adapted to energize solenoid 22 on a predetermined drop of voltage across the welding leads 13 from a suitable source of energy such as a battery 28. Trigger circuit 10 is provided with a line switch 24 normally closed during operation of the welder that serves as a means of disconnecting the circuit if for any reason movement of switch 18 is undesired. But, when operating under normal conditions, line switch 24 shown open for the purpose of illustration is placed in a closed position so as to allow for energization of the circuit through battery 28 on closure of a second switch 25 arranged as a low voltage relay associated with a solenoid 26. Relay switch 25 is also shown in open position for purposes of illustration, but is arranged for closure under force of gravity, or a like means, on de-energization of the solenoid 26 which in turn is energized during normal operation of the welding circuit through a potentiometer connected across the welding leads 13. Under normal operation of the welding circuit switch 25 is held in open position by the inductive force created in solenoid 26. By having solenoid 26 energized from the welding circuit 13 by means of tap-off circuit 30 in which a potentiometer 29 is connected provides for variable voltage adjustment relative to the capacitance of the solenoid 26 so as to hold switch 25 open as long as the voltage across the welding circuit 13 is sufficient to maintain an arc of the proper intensity between the work pieces. On a tendency to premature quenching of the arc established between the work pieces due to progressive "shorting," or closure, of the arc gap by the formation of joined particles of material across the arc gap, which is known in the art as "freezing," the resultant voltage drop in the welding circuit 13 decreases the pull of solenoid 26 below that required to hold switch 25 open, allowing it to close. Closure of switch 25 completes the circuit through battery 28, causing current to flow into and energize the coil of solenoid 22 causing it to move switch arm 18 from contact point 19 into engagement with contact point 20 of winding 16. Completion of the circuit through by-pass circuit 21, with switch 23 closed, will energize the transformer winding 16 from tap 17 to reduce its impedance and thereby cause a temporary increase in the power output of transformer 15. The effect of the increased transformer output is to throw sufficient power into the circuit 13 to burn away the "frozen" metal particles formed across the arc gap that have caused the tendency to "quenching" of the welding arc. Burning away of these particles will allow for re-establishment of the arc, permitting a satisfactory completion of the weld joint. The setting of potentiometer 29 placed across the weld circuit 30 provides for adjustment of the minimum voltage at which the solenoid 26 will release to permit closure of switch 25. Although no spring means is shown in connection with switch 25 it is obvious that in certain installations it will be found desirable to equip switch 25 with a toggle type spring means to more readily effect its rapid closure.

Figure 2:
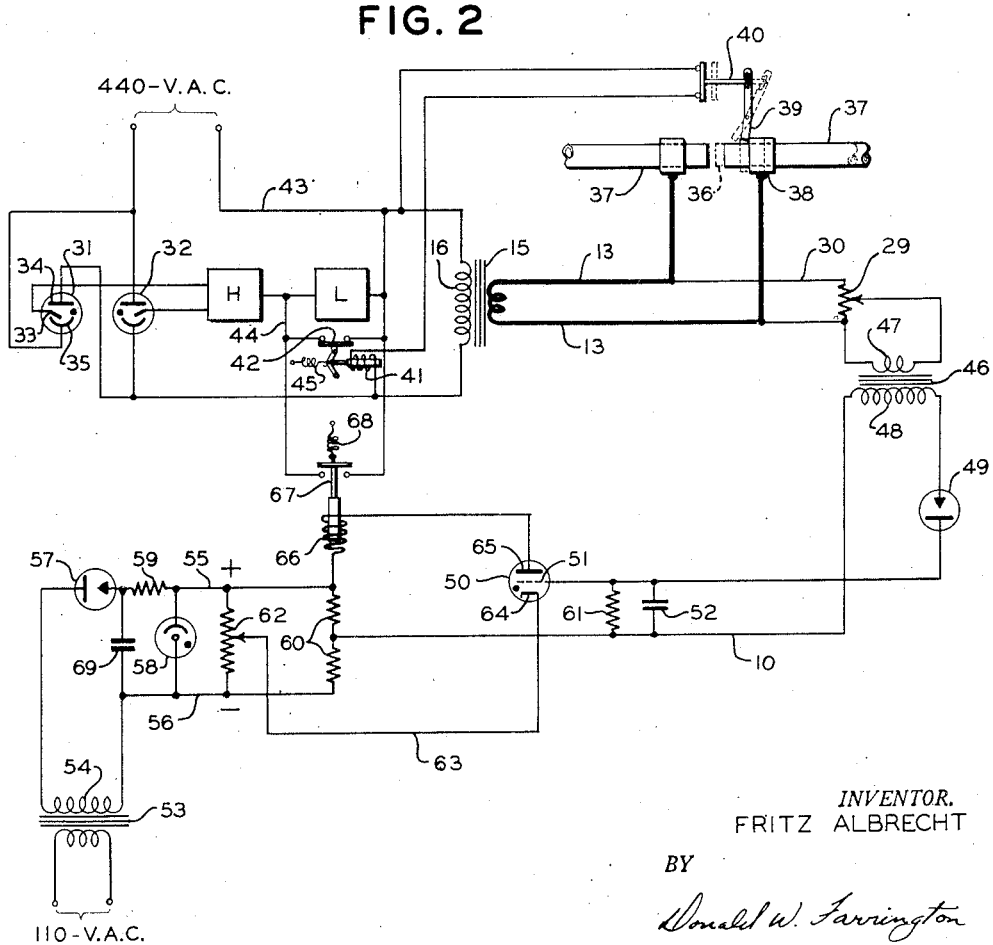
Figure 2 is a diagram of the present invention in its preferred embodiment as an auxiliary circuit arranged to control operation of the high and low voltage network of a conventional flash welding machine.

In Figure 2 I have illustrated the application of this invention to a conventional type of arc welding system having a high and low voltage phase shifting network. The flow of current supplied by an alternating current source S, customarily operable at approximately 440 volts, is controlled by means of a pair of electronic or space discharge devices 31 and 32 connected in inverse parallel and arranged to act as valves placed in series with the primary winding 16 of welding transformer 15. Although any suitable type of discharge device capable of providing synchronous control of the welding current may be used, for the purpose of this description, I have illustrated the use of valves of the mercury arc type in which each is provided with a starting electrode, or igniter 33, an anode 34 and a mercury pool cathode 35. In accordance with usual practice the operation of valves 31 and 32 is controlled by energization of electrodes 33 through the phase shifting network. This network is shown schematically as consisting of a high voltage bank H and a low voltage bank L connected across the primary welding circuit 43. By-passing of the current around the low voltage bank L is provided for by a by-pass circuit 44, having a circuit disconnect switch 42. During normal operation of the welder, the by-pass circuit switch 42 is held closed by a solenoid coil 41 arranged to operate against the pull of a spring 45 on energization controlled by and through the phase shifting network. According to conventional practice the high voltage bank H provides a relatively high welding voltage of approximately 6 volts at the beginning of the weld cycle capable of starting an arc between the work pieces 37 positioned for welding in platens 38 arranged as movable electrodes tapped across the secondary welding circuit 13 with the low voltage bank L being brought into operation to reduce the intensity of the arc by reducing the voltage at the platens 38 to approximately 4.2 volts after a suitable welding arc has been established. It is customary to attain this shift from high to low voltage operation by means of a mechanical tripping means associated with the platen moving mechanism, which for clarification is illustrated as a tripping arm placed adjacent to platen 38 and arranged for levered movement in contact therewith to open switch 40 connected in series with a solenoid coil 41, which in turn is arranged to actuate disconnect switch 42 to open the by-pass circuit 44 and place the low voltage bank L in operation on a predetermined movement of the platen.

It is understood, of course, that it is highly desirable to be able to provide different ranges of welding voltages to accommodate various thicknesses of material as well as different alloy compositions of the weld pieces being welded, which adjustability is customarily provided for in the conventional hook-up of banks H and L. Up until now, however, those skilled in the art have not found means of satisfactorily shifting the voltage of such a network back and forth over the ranges provided by the network once the welding cycle has been started, whereas with the trigger circuit of this invention responsive to a predetermined voltage drop across the welding leads I have been able to affect the power output of the welding transformer 15 to instantaneously increase the voltage at the weld point. In this manner I accomplish the highly desirable result of overcoming the tendency of the arc of the conventional arc welding machine to quench when the arc gap is inadvertently "shorted" prior to the establishment of suitable weld temperatures in the metal being welded.

In the improved arc control of this invention as applied to a conventional type of welding machine circuit as shown in Figure 2, the trigger circuit 10 is arranged for operation to shift the primary circuit 43 of the welding machine from low voltage operation effected by the operation of trip switch 40 back to high voltage operation on the first indication of a "freezing" of the arc as evidenced by a drop of voltage across the secondary welding circuit 13 below a predetermined limit. The minimum voltage to which the circuit can be allowed to drop, is predetermined by the setting of a potentiometer 29 in the takeoff circuit 30 tapped across the heavy welding leads 13. The effect of the drop in the welding circuit voltage is transmitted to the trigger circuit 10 through a step-up transformer 46 having a low voltage winding 47 connected across the takeoff circuit 30 at potentiometer 29. The function of the potentiometer 29 is to allow for variable adjustment of the voltage limit at which the trigger circuit 10 will "trigger" for different types and thicknesses of material welded. The potential induced in the high voltage winding 48 of transformer 46, is utilized to effect "trigger" operation of the trigger circuit when and as often as the voltage in the welding circuit drops below the point predetermined for a particular welding operation.

A half-wave rectifier 49 is placed in circuit with winding 48 of the transformer 46 to change the alternating current of the circuit to direct current for use as a control means. A source of current supply for operation of the switching mechanisms as "triggered" by the trigger circuit is provided by a second step-up transformer 53 tapped across a conventional alternating current supply line operating at substantially 110 volts, with the high voltage winding 54 of the transformer connected to the trigger circuit by means of conductors 55 and 56. A supply line rectifier 57 is placed in series adjacent winding 54 and connected so as to impose a positive potential on conductor 55. A gas filled regulator tube 58 is connected across conductors 55 and 56 to stabilize the operating potential in conjunction with a series connected resistor 59. An operating potentiometer 62 is tapped across conductors 55 and 56 to provide for energization of a gas filled triode control tube 50 arranged as a control means in the trigger circuit. The anode 65 of the tube 50 in turn is connected in series with winding 66 of a solenoid operated auxiliary cut-out switch 67 in the by-pass circuit 44. Switch 67 is normally held open by a spring 68 which allows for normal operation of the by-pass circuit 44 in connection with the phase shifting network as previously described. A pair of grid bias resistors 60, or similar biasing means, are connected across conductors 55 and 56 ahead of the control tube 50 with a tap extending therefrom to the opposite side of winding 48 of transformer 46 from which the trigger circuit rectifier 49 is connected. Rectifier 49 is connected to the grid 51 of tube 50 to supply direct current grid bias to said grid. A condenser 52 is placed across the circuit 10 to provide a certain degree of delay in the action of the trigger circuit to avoid any tendency of "hunting" which might otherwise occur as the intensity of the welding arc varies during normal operation. The resistance of each grid bias resistor 60 is such as to fix the grid bias placed on the control tube at the voltage at which it is desired that the circuit will "trigger." Likewise to increase the efficiency of operation an additional condenser 69 is connected across conductors 55 and 56. I have found during actual practice that in welding tubing or solid stock up to one and one half inches in diameter that a grid bias voltage of approximately 2 volts will give the most efficient operation of the trigger circuit.

Operation of my "anti-quench" device is as follows: In welding two work pieces 37 of tubing, or like material, held in the welding machine platens 38 adapted for movement toward each other to close the arc gap 36, the machine is energized from both sources of an alternating current supply of namely 110 volts and 440 volts. The electrical hook-up of the welding circuit is such that at the beginning of the welding cycle the disconnect switch is in open position with transformer 15 energized through the high voltage network H to place a potential of approximately 6 volts across the platens 38 in series with the welding circuit 13. The work pieces 37 are brought into contact with each other on movement of the platens so as to start an arc therebetween. Continued movement of the platen 38 brings it into engagement with the trip arm 39 causing closure of trip switch 40 arranged to energize solenoid winding 41 from circuit 43 and thereby effect closure of by-pass switch 42 to shunt the welding network from high to low voltage operation so as to reduce the voltage across the work pieces to approximately 4.2 volts. The movement of the platens before engagement with the trip arm 39 is predetermined according to the material being welded. A conventional setting for most operations is such as to allow for approximately 15% travel by the platen before the voltage is reduced to complete the welding cycle. In those instances where the welding arc is maintained satisfactorily and the arc welding voltage is held to the ideal of 4.2 volts, the machine will complete the welding cycle of operation without action of the trigger circuit taking place. However, in those instances where the arc tends toward "quenching" due to a "shorting" of the arc gap wherein the resistance is greatly reduced by "frozen" particles of metal bridging the arc gap 36 between the work pieces, or like condition, causing a reduction in the voltage to a point determined as being insufficient to produce a satisfactory weld, the trigger circuit "triggers" to increase the voltage and burn away the "frozen" condition of the work pieces. This "trigger" action results when the flow of current in circuit 63, energized from the 110 volt source of supply, which has been impeded by the negative charge on grid 51 of the control tube 50 in the trigger circuit through energization of transformer 48, is permitted by a "firing" of the control tube. On the voltage across the platens dropping to a dangerously low point, such as two volts, the potential imposed on grid 51 of the control tube 50 becomes insufficient to keep it from "firing" due to the change in bias imposed by resistors 63. "Firing" of the control tube 50 occurs on a change in grid bias sufficient to place a positive charge on the grid 51 allowing current to pass through circuit 63 energizing the solenoid 66 to operate switch 67 to close the by-pass circuit around the low voltage network and re-establish operation of the high voltage network H to boost the welding voltage and current sufficiently to burn out the "frozen" condition and re-establish the welding arc. On re-establishment of the welding arc between the work pieces, the voltage induced in transformer 46 of the trigger circuit 10 is also increased sufficiently to re-establish the grid bias of the control tube 50 and stop the flow of current through the by-pass switch solenoid 66 allowing switch 67 to re-open, placing the low voltage network L back in normal operation for the remainder of the welding cycle. The operation of the trigger circuit 10 is so arranged that the anti-quench operation and re-establishing of the welding arc is accomplished within about 15 cycles operation of the supply system operating at 60 cycles.

It should now be apparent from the above description that I have provided an improved welding circuit which by controlling the welding transformer output according to the intensity of the arc provides a positive means of keeping the flashing voltage within the proper range required to produce the best metallurgical and mechanical joint. Furthermore, by providing such operation as an automatic function of the machine enables successive welds to be accomplished, allowing the machine to be operated at its most efficient rate of production.

While I have described my invention in detail in its preferred embodiment, it will be obvious to those skilled in the art after understanding my invention that various changes, alterations, modifications and substitutions can be made therein without departing from the spirit and scope of the appended claims.

I claim as my invention:

1. In a flash welding machine including a variable current transformer connected to a power supply means, the combination with work piece holding means connected to receive current from the transformer to provide a welding arc, means to move said work holding means toward each other to establish said welding arc between the work pieces, of a low voltage responsive means connected across the work pieces and associated with the supply means to change the transformer connections to increase the current output of the transformer on a reduction in voltage at the work pieces.

2. A flash welding machine having a variable welding current output means including shiftable power supply connection means, movable work piece holding means connected to the welding current means, means to move the work pieces together to establish an arc across the work, switch means operatively associated with the work holding means responsive to a reduction in potential of the welding current at the work pieces to operate said shiftable power means to increase the welding current output.

3. In a flash welding machine having a variable potential welding current transformer including changeable current supply taps, the combination comprising a current supply, a movable work holding means connected with the welding transformer, work moving means for bringing the work together to establish a welding arc of a predetermined minimum potential across the work, a trigger circuit having a potential responsive switch associated with the work holding means and arranged for energization on operation of said potential responsive switch, current supply control means arranged for operation on energization of the trigger circuit to change the supply taps of the transformer on a reduction of the potential at the work below said predetermined minimum to effect an increase in said potential.

4. In a flash welding system having a welding transformer supplied from a supply line through variable feed and disconnect points, a secondary winding with secondary leads connected to movable work pieces arranged for establishing of flow of current by means of an arc between said work pieces, the combination of a connection changing switch associated with the supply line having a movable connection arranged for movement between various contact points, circuit connection means between said switch and the welding transformer for providing connection and disconnection of supply current between the switch and transformer, motivation means for said switch connected across the secondary leads by means of a potentiometer and arranged for operation to disconnect the supply current from the transformer on a predetermined decrease of potential at said potentiometer.

5. An electric flash welding system comprising a source of electric welding current, a welding load carried by movable platens, switching means associated with the movable platens to control the potential of the current furnished said load on movement of said platens, a control circuit having a source of electrical energy, an auxiliary switch responsive to flow of energy in said control circuit to control the potential of the current furnished said load and means responsive to a low potential at the work load to trigger the control circuit to operate the auxiliary switch on a predetermined drop in potential at the work load.

6. In a flash welder the combination of an electric welding means having a high and low voltage welding current output network, switching means for changing said network from one voltage output to the other and a control circuit means responsive to a decrease in voltage therein below a predetermined minimum for switching said network to high voltage output operation on said decrease in voltage.

7. An electric flash welding system having a welding circuit adapted for connection to an alternating current source, said welding circuit being provided with high voltage and low voltage networks, a pair of oppositely connected electric valves interposed between said source and circuit, each of the valves having a control electrode and a plurality of principal electrodes with means to control the flow of current through said valves to provide for operation of the high and low voltage networks in the circuit, a work load carried by movable platens, switch means operable on movement of said platens to shift the circuit from high to low voltage operation, a trigger circuit to shift the welding circuit back to high voltage operation on a drop in voltage below the previously stated low voltage comprising a by-pass circuit arranged to cut-out the low voltage network, an auxiliary switch in the by-pass circuit, a motivating circuit supplied with electrical energy to actuate said switch, a grid controlled space discharge device in the last mentioned circuit with means to control grid bias on said device comprised of means to establish a potential variable in accordance with the potential at the work load whereby on a reduction in voltage at said work load current the opposing potential is overcome, allowing current to flow, actuating the auxiliary switch.

8. An electric flash welding system having a welding circuit divided into a high voltage and a low voltage network adapted to be connected to an alternating current source with shift means for by-passing the low voltage network during operation, a work load carried by movable platens, means to shift the circuit to high voltage operation comprising an auxiliary switch in a by-pass circuit arranged to by-pass said low voltage network for increasing the voltage at the work load, actuating means for operating said switch, a second circuit with a source of supply current arranged to provide an operating potential to said actuating means, a grid controlled space discharge device in said circuit to control flow of current therein, a trigger circuit connected across the work load and arranged to establish an opposing bias potential on the grid of said control device to restrict flow of current in said circuit until the bias is overcome on a predetermined reduction in voltage at the work load.

9. The method of flash welding metal work pieces which consists of imposing electric welding current of sufficient potential thereto to establish an arc between said work pieces arranged as movably spaced electrodes, moving said electrodes into welding position with an arc gap therebetween and increasing the voltage at the work pieces to re-establish said arc quenched on closure of the arc gap by particles of metal evidenced by a reduction of voltage between said work pieces.

10. The method of flash welding metal work pieces which consists of imposing electric welding current of sufficient potential thereto to start an electric arc across an arc gap established therebetween, reducing said potential to avoid excessive heating and instantaneously increasing said potential on an excessive reduction in potential to re-establish an arc quenched by a bridging of the arc gap.

11. The method of flash welding articles composed of metals sensitive to burning by excessive current flow which consists of applying welding current to the work pieces arranged as movable electrodes, moving the pieces into contact with each other sufficiently to cause flow of current therebetween to establish an arc gap, continuing movement of said pieces toward each other at a predetermined rate sufficiently fast to maintain the arcing work pieces at the proper temperature for welding and instantaneously cutting off the welding current on failure of the arc due to quenching by a bridging of the arc gap by particles of metal and thereby avoiding injury of the metal which would otherwise result from an excessive flow of welding current.

12. The method of flash welding work pieces composed of metals sensitive to excessive flow of welding current which consists of applying a welding current to the work pieces arranged as movable electrodes, moving the pieces apart to establish a welding arc across the gap formed between said pieces of sufficient intensity to heat the pieces to the proper temperature for welding under pressure and instantaneously disconnecting the welding current on an elimination of the arc gap by premature quenching due to the forming of a metallic bridge across said gap evidenced by a reduction in the potential of said welding current below a predetermined minimum and thereby avoiding injury of the metal by an excessive flow of current through the work pieces.

FRITZ ALBRECHT.

REFERENCES CITED

The following references are of record in the file of this patent:

UNITED STATES PATENTS

| Number | Name | Date |
| --- | --- | --- |
| 1,808,717 | Stryker | June 2, 1931 |
| 1,916,012 | Otto et al. | June 27, 1933 |
| 1,916,013 | Otto et al. | June 27, 1933 |
| 2,404,620 | Cooper | July 23, 1946 |
| 2,412,067 | Smith | Dec. 3, 1946 |

FOREIGN PATENTS

| Number | Country | Date |
| --- | --- | --- |
| 507,541 | Great Britain | June 16, 1939 |